US011064568B2

(12) United States Patent
Jester et al.

(10) Patent No.: US 11,064,568 B2
(45) Date of Patent: Jul. 13, 2021

(54) SYSTEM AND METHOD FOR AUTOMATED RELATIVE POSITION DETERMINATION OF WIRELESS ACCESS POINTS

(71) Applicant: Panasonic Avionics Corporation, Lake Forest, CA (US)

(72) Inventors: Samuel Jester, Lake Forest, CA (US); Philip Watson, Lake Forest, CA (US); Steven Bates, Mission Viejo, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 16/600,329

(22) Filed: Oct. 11, 2019

(65) Prior Publication Data

US 2021/0112625 A1  Apr. 15, 2021

(51) Int. Cl.
*H04W 88/08* (2009.01)
*H04B 17/318* (2015.01)
*H04W 84/18* (2009.01)
*H04W 48/16* (2009.01)
*H04L 29/12* (2006.01)

(52) U.S. Cl.
CPC .......... *H04W 88/08* (2013.01); *H04B 17/318* (2015.01); *H04L 61/6022* (2013.01); *H04W 48/16* (2013.01); *H04W 84/18* (2013.01)

(58) Field of Classification Search
CPC ..... H04W 88/08; H04W 48/16; H04W 84/18; H04B 17/318; H04L 61/6022
See application file for complete search history.

(56) References Cited

U.S. PATENT DOCUMENTS

| 9,271,243 | B2 | 2/2016 | Yoon et al. |
| 9,723,510 | B1* | 8/2017 | Beluri .................. H04W 24/02 |
| 10,257,712 | B2 | 4/2019 | Bhanage et al. |
| 10,397,932 | B2* | 8/2019 | Gonzalez Garrido ...................... H04W 72/082 |
| 2007/0054670 | A1* | 3/2007 | Kalika .................. H04L 41/12 455/446 |
| 2007/0082677 | A1* | 4/2007 | Donald Hart ......... H04W 16/18 455/456.1 |
| 2007/0197229 | A1 | 8/2007 | Kalliola et al. |

(Continued)

FOREIGN PATENT DOCUMENTS

EP  3048846 B1  7/2018

*Primary Examiner* — Michael J Moore, Jr.
(74) *Attorney, Agent, or Firm* — Perkins Coie LLP (57) ABSTRACT

Systems, methods, and computer-readable media for automated detection of relative position among a plurality of wireless access points (WAPs) deployed in service area. An exemplary service area is the passenger cabin of a commercial airplane. The method can include transmitting a signal on a wireless channel at a fixed power level across the service area. Each WAP can measure a signal strength of the signal received from all other WAPs of the plurality of WAPs. The plurality of WAPs can share reports including signal strengths of the signal transmitted from all of the other WAPs. Each WAP can then form a matrix of measured signal strengths and measuring WAPs including the signal strength of signals transmitted by each WAP as received by all other WAPs as the measuring WAPs. The matrix can be used to determine a relative position of the plurality of WAPs based on the first matrix.

17 Claims, 5 Drawing Sheets

(56) References Cited

U.S. PATENT DOCUMENTS

| | | | | |
|---|---|---|---|---|
| 2011/0287787 A1* | 11/2011 | Nagaraja | ............... | H04W 4/029 |
| | | | | 455/456.3 |
| 2013/0279349 A1* | 10/2013 | Pandey | ................ | H04W 16/18 |
| | | | | 370/252 |
| 2014/0256346 A1* | 9/2014 | Venkatraman | ........ | G01S 5/0252 |
| | | | | 455/456.1 |
| 2014/0266916 A1* | 9/2014 | Pakzad | ................ | G01S 5/0242 |
| | | | | 342/464 |
| 2015/0080019 A1* | 3/2015 | Edge | .................... | G01S 5/0236 |
| | | | | 455/456.1 |
| 2015/0119068 A1* | 4/2015 | Kudekar | ................ | H04W 4/33 |
| | | | | 455/456.1 |
| 2015/0133167 A1* | 5/2015 | Edge | .................... | H04W 4/025 |
| | | | | 455/456.3 |
| 2015/0264519 A1* | 9/2015 | Mirzaei | ................ | G01S 5/0252 |
| | | | | 455/457 |
| 2015/0312774 A1* | 10/2015 | Lau | ...................... | H04W 24/10 |
| | | | | 455/446 |
| 2016/0127926 A1* | 5/2016 | Xie | ...................... | H04W 16/22 |
| | | | | 455/67.7 |
| 2016/0174147 A1* | 6/2016 | Chen | ................... | H04W 64/00 |
| | | | | 370/252 |
| 2016/0334498 A1* | 11/2016 | Jamieson | ................. | G01S 5/04 |
| 2017/0013545 A1 | 1/2017 | Ma | | |
| 2017/0303138 A1* | 10/2017 | Barmettler | ........ | H04W 72/0453 |
| 2018/0041985 A1* | 2/2018 | Davaadorj | ............ | G01S 5/0289 |
| 2018/0332583 A1 | 11/2018 | Shah et al. | | |

\* cited by examiner

SYSTEM AND METHOD FOR AUTOMATED RELATIVE POSITION DETERMINATION OF WIRELESS ACCESS POINTS

BACKGROUND

Technical Field

This disclosure relates wireless access points (WAPs) and communication using the same. More specifically, this disclosure relates to systems and methods for automated determination of relative position of multiple WAPs.

Related Art

WAPs can be installed within a service area using various topologies and wiring configurations. In order to maximize coverage within a service area of the WAPs, it is beneficial to physically organize the WAPs throughout the cabin so they may be optimized for data transmission. However, WAPs may not always be installed at the same time or by the same technician. Therefore the WAPs may not be organized in an optimal way and either provide incomplete coverage or interfere with one another and provide suboptimal coverage. Repeated manual updates to the physical relationship or mapping sequence of the WAPs can be a time intensive process.

SUMMARY

One aspect of the disclosure provides a method for automated detection of relative position among a plurality of wireless access points (WAPs) deployed in a service area. The method can include transmitting a signal on a wireless channel at a fixed power level across the service area, each signal including a media access control (MAC) address of a respective WAP of the plurality of WAPs. The method can include measuring a signal strength of the signal received from all other WAPs of the plurality of WAPs. The method can include sharing, among the plurality of WAPs, reports from each WAP including signal strengths of the signal transmitted from all of the other WAPs. The method can include forming, in a memory, a first matrix of measured signal strengths and measuring WAPs, the measured signal strengths including the signal strength of signals transmitted by each WAP as received by all other WAPs as the measuring WAPs. The method can include determining a relative position of the plurality of WAPs based on the first matrix.

Another aspect of the disclosure provides a non-transitory computer-readable medium for automated detection of relative position among a plurality of wireless access points (WAPs) deployed in a service area. When executed by one or more processors, the instructions cause the one or more processors to transmit a signal on a wireless channel at a fixed power level across the service area, each signal including a media access control (MAC) address of a respective WAP of the plurality of WAPs. The instructions can further cause the one or more processors to measure a signal strength of the signal received from all other WAPs of the plurality of WAPs. The instructions can further cause the one or more processors to share reports from each WAP including signal strengths of the signal transmitted from all of the other WAPs. The instructions can further cause the one or more processors to form a first matrix of measured signal strengths and measuring WAPs in a memory, the measured signal strengths including the signal strength of signals transmitted by each WAP as received by all other WAPs as the measuring WAPs. The instructions can further cause the one or more processors to determine a relative position of the plurality of WAPs based on the first matrix.

Another aspect of the disclosure provides a system for wireless communication in a service area. The system can include a first wireless access point (WAP) deployed in the service area. The first WAP can transmit a first signal on a wireless channel at a fixed power level across the service area. The first signal can have a first media access control (MAC) address of the first WAP. The system can include a second WAP deployed in the service area. The second WAP can transmit a second signal on the wireless channel at the fixed power level. The second signal including a second MAC address of the second WAP. The system can include a third WAP deployed in the service area. The third WAP can transmit a third signal on the wireless channel at the fixed power level. The third signal can have a third MAC address of the third WAP. The first WAP, the second WAP, and the third WAP can measure a signal strength of received signals received from all other WAPs. The first WAP, the second WAP, and the third WAP can share reports including the measured signal strengths of the received signals with all other WAPs over the wireless channel. The first WAP, the second WAP, and the third WAP can form a first matrix of the measured signal strengths and measuring WAPs in a memory, the measured signal strengths including the signal strength of signals transmitted by each WAP as received by all other WAPs as the measuring WAPs. The first WAP, the second WAP, and the third WAP can determine a relative position of the first WAP, the second WAP, and the third WAP based on the first matrix.

Other features and advantages will become apparent to one or ordinary skill in the art with a review of the following detailed description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

This disclosure provides systems and methods for automated or self-determination of relative position of multiple WAPs. In general, a plurality of WAPs installed in a service area can implement various measuring techniques to determine the physical relationships among the multiple WAPs. For example, the system can determine that, for example, WAP 1 is next to WAP 2, WAP 2 is next to WAP 1 and 3, and so forth. This can be done automatically by the WAPs based on applying the physics of signal propagation in free space. If all WAPs are transmitting at a known default power setting and the WAP is scanning the frequency space for other WAPs transmitting it can logically determine that the stronger signal are the WAPs located physically closer or with a wireless channel condition to the measuring WAP that is less obstructive.

Figure 1:
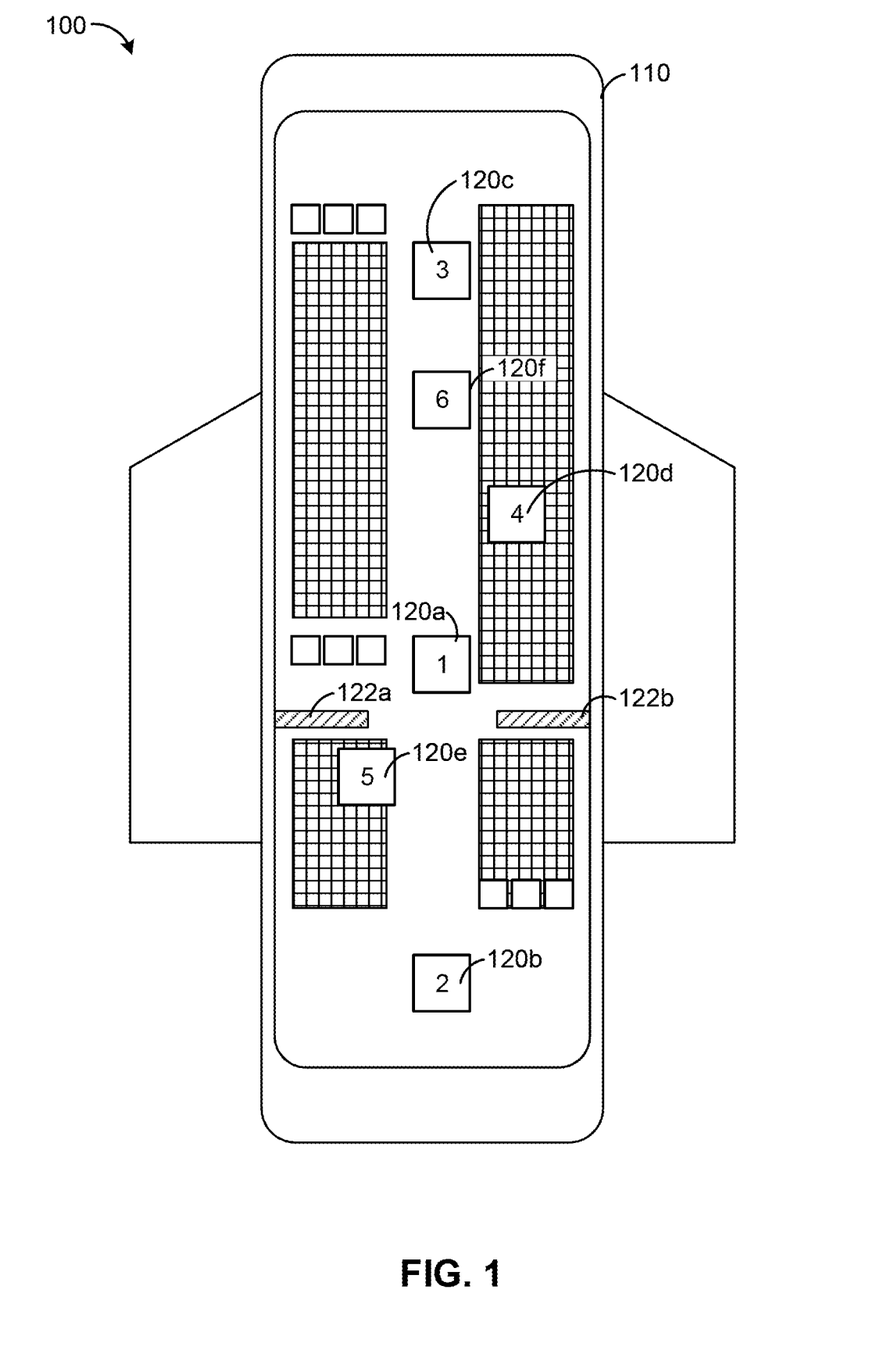
FIG. 1 is a graphical representation of a system for providing wireless service.

FIG. 1 is a graphical representation of a system for providing wireless service. A system for providing wireless service (system 100) can be implemented within a wireless service area 110. The wireless service area 110 can have multiple distributed wireless access points (WAPs) 120. Six WAPs 120 are shown and labeled 120*a*, 120*b*, 120*c*, 120*d*, 120*e*, 120*f*. The number of WAPs 120 is not limiting on the disclosure. The WAPs 120 can provide wireless service to occupants of the service area via a wireless network, for example. In some examples, there can be more than one wireless network such as a 2.4 GHz network and a 5.0 or 5.6 GHz network. The WAPs 120 can further provide coordinated wireless service to users within the service area 110. The WAPs 120 can be communicatively coupled by the one or more wireless networks.

In a primary example as used herein, the service area 110 is can be a passenger airplane cabin. This is not limiting on the disclosure as the system 100 can be deployed in many different kinds of service areas 110 (e.g., a commercial building (FIG. 6), a home, a train, a bus (FIG. 5), etc.). As illustrated in FIGS. 1-6, the WAPs 120*a-f* can be disposed in any portion of the service area as needed. In the following examples, X refers to horizontal position, Y refers to vertical position, and Z refers to elevation position. For example as illustrated in FIG. 1, the WAP 120*a* can be disposed in an overhead compartment (e.g., with location coordinates X1, Y1, Z1), the WAP 120*e* (e.g., with location coordinates X2, Y2, Z2) can be disposed under a seat, or the WAPs 120*b* (e.g., with location coordinates X3, Y3, Z3) can be disposed on or within a bulkhead, and other WAPs 120*c-f* are positioned throughout the airplane cabin (e.g., with respective location coordinates X4, Y4, Z4; X5, Y5. Z5; X6, Y6, Z6).

In one variation of this example, the location coordinates X1-X6, Y1-Y6, Z1-Z6 are all different from one another. e.g., so the WAPs 120*a-f* are 3 dimensionally spaced from one another. In yet another variation of this example, the location coordinates X1-X6, Y1-Y6, Z1-Z6 may be in the same plane (share one common X, Y, or Z value), e.g., so the WAPS 120*a-f* are 2 dimensionally spaced from one another. In yet another example, pairs of the WAPs 120*a-f* may have the location coordinates X1-X6, Y1-Y6, Z1-Z6, with two or more coordinates and share a common plane (a 2 dimensional spacing from one another (share one common X, Y, or Z value). As such, the WAPS 120*a-f* can be positioned and operate throughout a service area independent of positioning values (e.g., X1-X6. Y1-Y6, Z1-Z6) and can have one dimensional, two dimensional, or three dimensional spacing between each of the WAPs in the disclosed methods and systems.

The WAPs 120 can be installed or otherwise deployed and provisioned during construction of the service area 110. In some examples, one or more of the WAPs 120 can be later replaced for maintenance reasons. In either case, the WAPs 120 may not be symmetrically distributed throughout the service area 110. This can result is unequal service throughout the service area 110 based on coverage of the individual WAPs 120. In some examples, the service area 110 may further have certain obstacles 122 (shown as 122*a*, 122*b*) that affect the transmission or reception of wireless signals from the WAPs 120. Such obstacles can be bulkheads, cabinets, overhead compartments, or similar obstructions that affect the transmission of wireless signals. These factors (e.g., distribution and obstacles) can result in suboptimum reception at user devices within the service area.

In some implementations, the WAPs 120 can each have an identifier or address. The WAPs 120 can have a media access control (MAC) address that uniquely identifies that wireless communication device, for example, on the wireless network. The WAPs 120 of FIG. 1 each have a numeral (1-6) listed that arbitrarily represents the address (e.g., MAC address) of the respective WAP 120. The WAPs 120 can also have a service set identifier (SSID) that identifies the wireless network(s) or portion of the wireless network(s) established by individual WAPs 120. The identifiers provide the system 100 a basis for the organization of the system, so that individual WAPs 120 can be identified and tuned or directed to minimize interference. This can further allow the WAPs 120 to focus transmissions to users and avoid unnecessary overlaps in transmissions or deadspots in coverage. In some examples, the WAPs using directional radiofrequency (RF) transmission (e.g., the IEEE 802.11 family of wireless protocols) can appropriately steer beams to users based on the location of adjacent WAPs 120.

Some aircraft can be provisioned with a first group of WAPs 120 can may (or may not be sequentially arranged. For example, this can include numbering the WAPs 120 from 1-6 from front to back, where the numbers 1-6 represent the MAC address or other addressing. The WAPs 120 can be replaced over time or be installed in a non-sequential or otherwise unknown sequence. Accordingly, the WAP 120*e* may not be provisioned with the identity of the most adjacent WAPs 120*a*, 120*b*. The present disclosure eliminates the need to manually update the WAPs 120 with the proper sequence in order to optimize transmission.

In some embodiments, the system 100 can be organized as a decentralized or ad hoc network. In such an embodiment, the all of the WAPs 120 of the system 100 can perform the same processes. In some examples, this can include the same applications run on multiple host devices (e.g., the WAPs 120). For example, this can be implemented using, for example, Docker (application containers) in a Machine Swarm. In such an example, there can be a common process (e.g., an application) running on multiple physical or virtualized machines. Depending on the present load of each host device (e.g., the WAPs 120) within the swarm the process can be load balanced among the host devices. In such an example, each of the WAPs 120 can perform load sharing to perform the processes or methods disclosed herein. In this embodiment respect, there is no centralized controller.

In other embodiments, the system 100 can be controlled by a "master" device or central controller. In such an embodiment, a master-slave relationship would be established in which the is one controller (e.g., the master) that can make decisions or perform management tasks for the other slave devices. In a centralized controller network, a single host device is dedicated to performing processing for the whole group (e.g., the WAPs 120). In this example, a master device could be one of the WAPs 120.

Within the wireless network, the WAPs 120 can perform tasks such as transmission of beacon signals, probe requests/responses, and transmission of other kinds of wireless messages including custom wireless messages purposely built for this measurement process.

Figure 2:
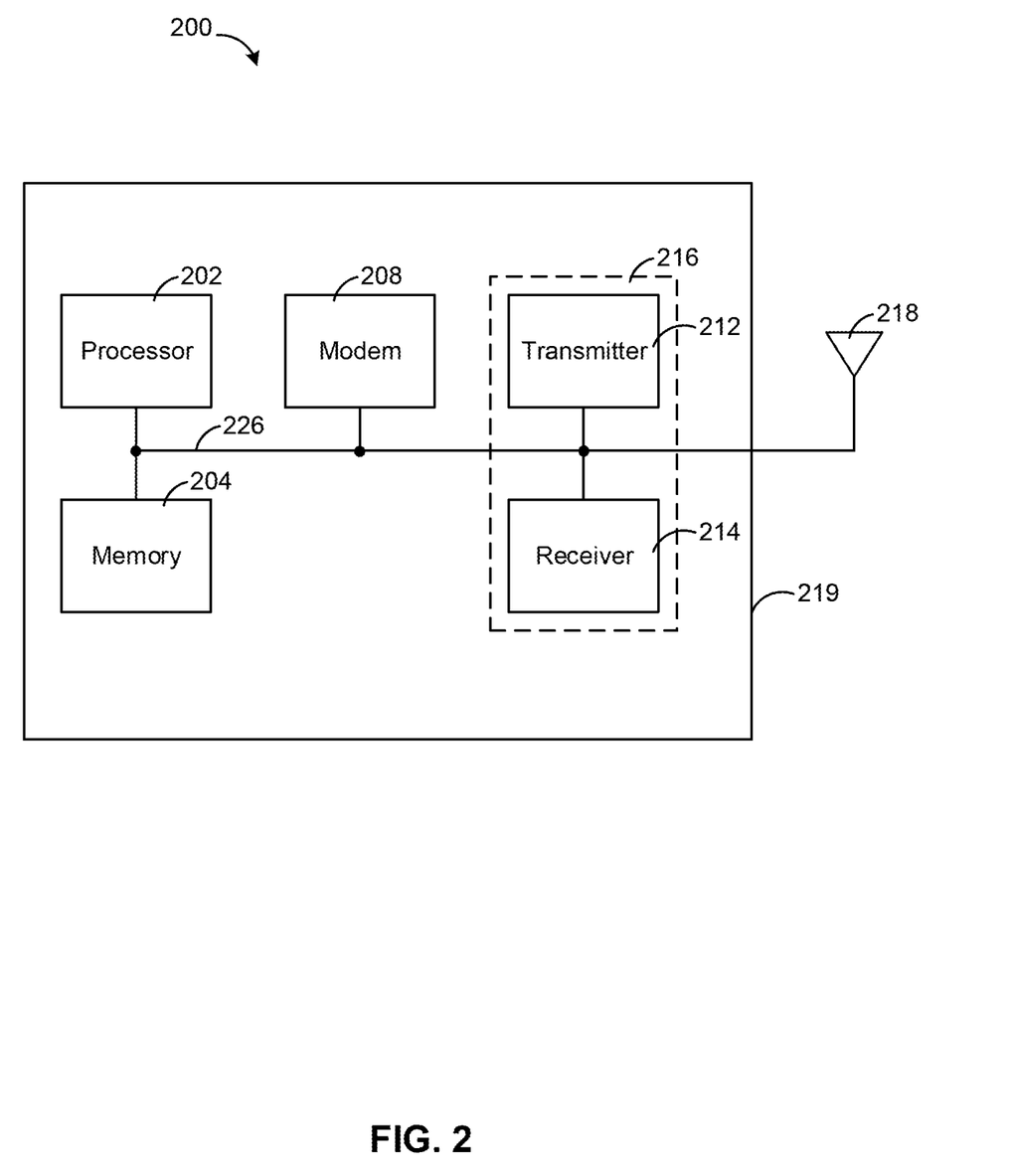
FIG. 2 is a functional block diagram of a device for use with the system of FIG. 1.

FIG. 2 is a functional block diagram of a device for use with the system of FIG. 1. A communication device (device) 200 can be implemented as one or more of the WAPs 120. The device 200 can have one or more processors (processor) 202. The processor 202 can control operation of the device 200. The processor 202 may also be referred to as a central processing unit (CPU). The processor 202 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 202 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 202, cause the processing system to perform the various functions described herein.

The device 200 can have a memory 204 operably coupled to the processor 202, which may include both read-only memory (ROM) and random access memory (RAM), providing instructions and data to the processor 202. A portion of the memory 204 may also include non-volatile random access memory (NVRAM). The processor 202 can perform logical and arithmetic operations based on program instructions stored within the memory 204. The instructions in the memory 204 may be executable to implement the methods described herein. The memory 204 can store information related to WAP operation, including storing information related to signals received from other WAPs 120. The memory 204 can store signal strength measurement information, as described below.

The device 200 can have a modem 208 coupled to the processor 202. The modem can convert (e.g., modulate and demodulate) data into a format suitable for a transmission medium so that it can be transmitted from device to device (e.g., between or among the WAPs 120). The modem 208 can modulates one or more carrier wave signals to encode digital information for transmission and demodulates signals to decode the transmitted information.

The transmitter 212 and the receiver 214 can be combined as a transceiver 216. The transmitter 212 and the receiver 214 (e.g., the transceiver 216) can be coupled to one or more antenna 218. The transmitter 212 and the receiver 214 (e.g., the transceiver 216) can be coupled to the processor 202 and the modem 208.

The device 200 may also include a transmitter 212 and a receiver 214 to allow transmission and reception of data between the device 200 and a remote location. For example, such communications may occur between and among the WAPs 120 and mobile device users within the service area 110. The transmitter 212 and receiver 214 may be combined into a transceiver 216. One or more antennas 218 may be attached to a housing 219 and electrically coupled to the transceiver 26 or to the transmitter 212 and the receiver 214 independently. Multiple antennas 218 may be present for use with directional communications (e.g., IEEE 802.11ac protocol). The device 200 may also include (not shown) multiple transmitters, multiple receivers, multiple transceivers, and/or multiple antennas.

The various components of the device 200 described herein may be coupled together by a bus system 226. The bus system 226 may include a data bus, for example, as well as a power bus, a control signal bus, and a status signal bus in addition to the data bus. Those of skill in the art will appreciate the components of the device 200 may be coupled together or accept or provide inputs to each other using some other mechanism.

Figure 3:
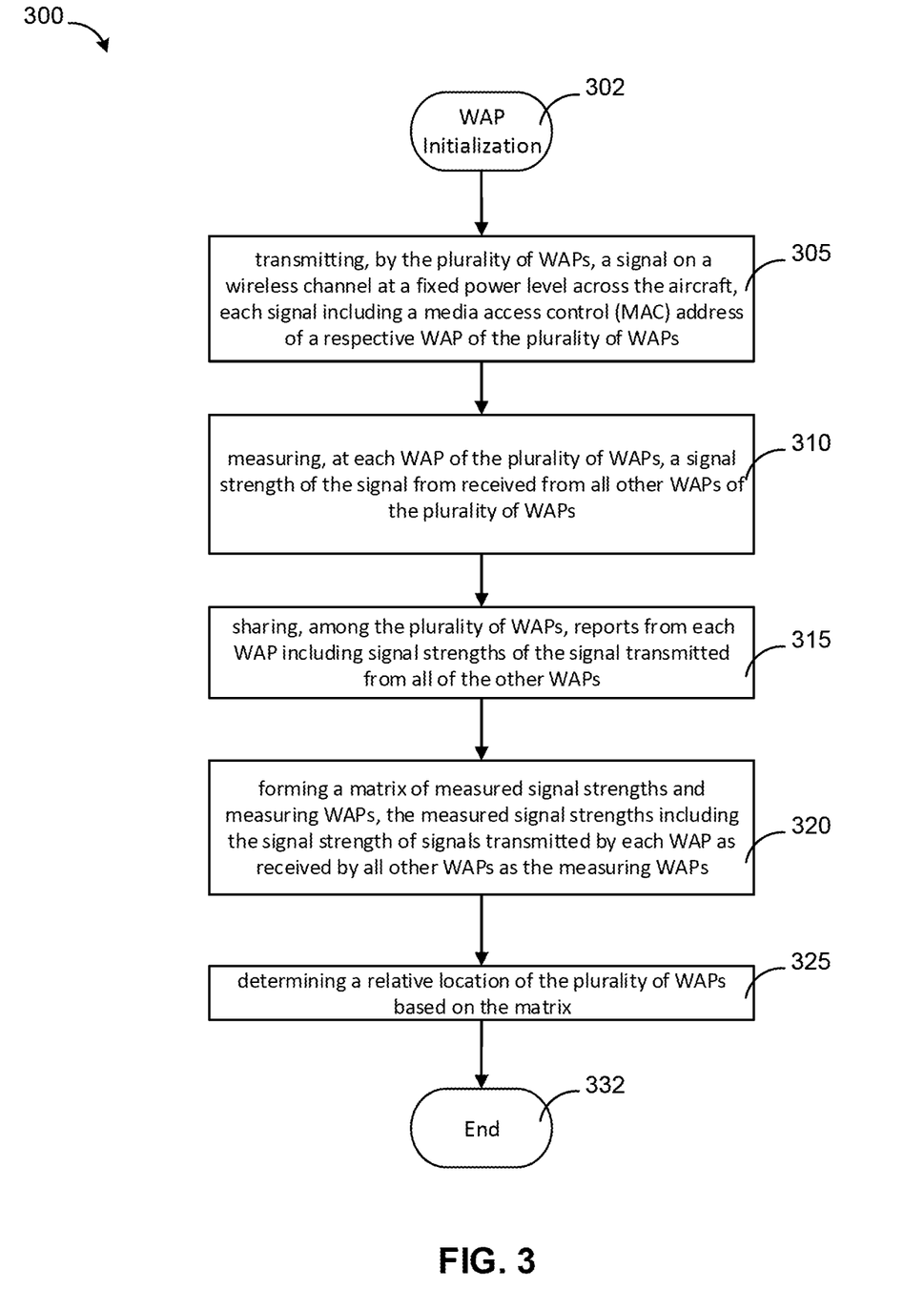
FIG. 3 is a flowchart of a method for automated relative position determination of the WAPs of FIG. 1.

FIG. 3 is a flowchart of a method for automated relative position determination of the WAPs of FIG. 1. A method 300 can provide a process for optimizing the coverage of the WAPs 120 within the service area 110. The WAPs 120 installed within the service area 110 may not have a sequential organization or the order may not be known. Without information related to the spatial distribution (e.g., relative position) of surrounding WAPs 120, wireless service may not be distributed optimally.

The method 300 can begin at block 302 with initialization of each of the WAPs 120. This can be similar to a power-on state or process.

At block 305, each of the WAPs 120 can transmit a signal to the other WAPs 120. This can occur for a fixed period of time and at a fixed power level. In some examples this can use a 2.4 GHz frequency which can be an unlicensed portion of the spectrum. In other examples, 5 GHz can also be used. The signal can be a beacon or other messaging consistent with the wireless network (e.g., an ad hoc wireless network). The signal can be transmitted at a fixed power level across the service area 110 (e.g., the aircraft). All of the WAPs 120 can scan for adjacent WAPs 120 that are broadcasting, and thus receive the transmitted signal from all of the other WAPs 120 in the service area 120. The MAC address and/or SSID of the transmitting WAP 120 can be included in the signal.

At block 310, all of the WAPs 120 can measure a strength of the signal (e.g., the beacon) received from the other WAPs 120. For example, the WAP 120a can transmit (as in block 305) a first signal that is received by the WAPs 120b-120f. Similarly, the WAP 120a can receive similar signals (e.g., beacons) from the other WAPs 120b-120f. The strength of the signal (or signal strength) can be measured in terms of received signal strength indicator (RSSI) or received channel power indicator (RCPI), for example.

At block 310, each of the each of the WAPs 120 can further record (e.g., in the memory 204) the signal strength (e.g., RSSI, RCPI) related to the signals transmitted by all of the other WAPs 120. The MAC address of the transmitting WAP 120 can also be included with the signal strength measurement.

At block 315, the WAPs 120 can share the measured signal strengths over the network. Thus, each of the WAPs 120 can receive a report of the measured signal strengths of all the other WAPs 120 as measured at each WAP 120.

Figure 4:
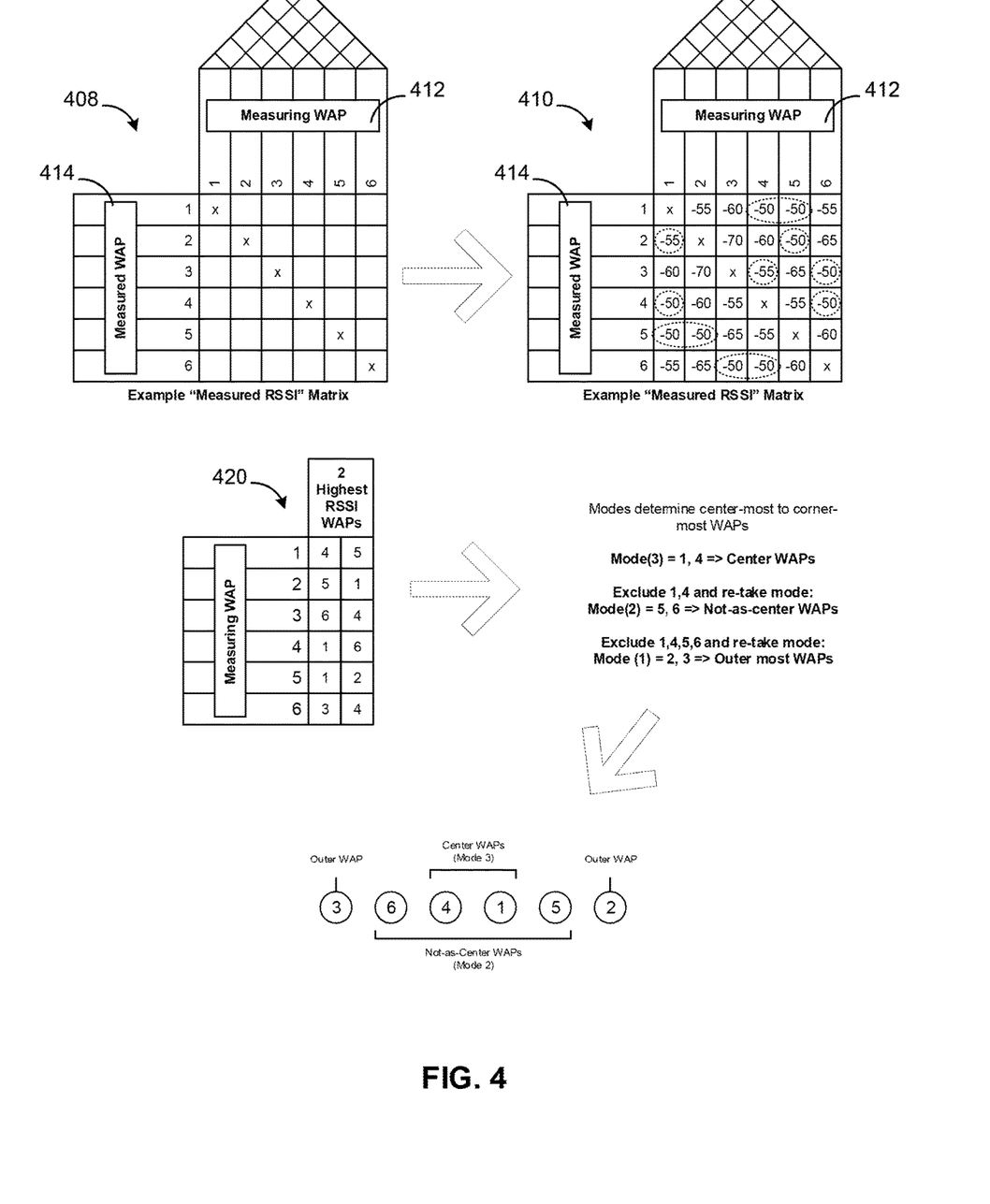
FIG. 4 is a graphical depiction of an embodiment of portions of the method of FIG. 3.

At block 320, a matrix (see FIG. 4) of all of the measured signal strengths can be constructed based on the receiving in block 315. In some implementations, each WAP 120 can generate a matrix (a first matrix) of all of the signal strengths based on those received from all of the other WAPs 120. The matrices formed at each WAP 120 should necessarily be the same as all of the others, given the shared measurements in block 315. The matrix can include a plot of measured WAPs against measuring WAPs, as shown in FIG. 4, noting the signal strength of each WAP as measured by all the other WAPs.

In some other implementations, one of the WAPs 120 designated as the master device can form (e.g., in the memory 204) the matrix of the measured signal strengths and share it with the rest of the WAPs 120.

In block 325, each of the WAPs 120 can determine a relative position to all other WAPs 120 in the service area 110 based on the matrix. The process of using the matrix in block 325 to determine relative position is described below in connection with FIG. 4.

The method 300 can end at block 332. In some implementations, the method 300 can be repeated periodically at a user-defined interval. For example, the method can be performed every 30 minutes, 1, hour, 2 hours, etc., to re-assess channel conditions within the service area 110.

FIG. 4 is a graphical depiction of an embodiment of portions of the method of FIG. 3. As the WAPs 120 share their signal strength measurements (e.g., RSSI, RCPI), a table 408 can be populated with each measurement taken in the method 300. The signal strength measurements can be used to generate a matrix 410 (e.g., a first matrix) based on the signal strength measurements. The matrix 410 can include a measurement of signals strengths of every WAP 120 by every other WAP 120. Thus, in the present example of the six WAPs 120 of FIG. 1, the matrix 410 is six by six. This is not limiting on the disclosure. One of ordinary skill would readily recognize that other numbers of WAPs 120 and matrix dimensions are also possible. For example, matrices such as 4×4, 5×5, and 7×7 are also possible. The measured WAPs 412 are shown on as rows of the matrix 410 while measuring WAPs 414 are listed in columns. Exemplary values for each measured signal strength are shown in the matrix 410 in terms of dBm (decibel milliwatt).

Next, a matrix 420 (e.g., a second matrix) is formed identifying the measured WAPs 120 having the highest signal strength for each measuring WAP. The values used to determine the highest signal strengths of the matrix 420 are shown in dashed circles in the matrix 410. The WAP number associated with the highest signal strengths are used to populate the matrix 420. From the matrix 420, the highest occurring modes correlate to the centermost WAPs 120, while the lowest modes correspond to outermost WAPs 120.

In embodiments in which the two highest signal strengths of the matrix 420 are ambiguous, or in which more than two received signal strength measurements of the WAPs 120 are exactly the same and the two highest signal strengths cannot be determined, the measurement process (e.g., the process of block 310) can be repeated until two highest signal strengths are determined.

In the example shown, in the matrix 410 and the matrix 420, the mode (3) for WAPs labeled 1 and 4 (e.g., the WAPs 120a, 120d of FIG. 1), are the centermost WAPs 120. Both WAPs 1 and 4 have the highest measured RSSI for three of the other WAPs in the service area 110.

Next, the WAPs 1 and 4 can be excluded in favor of the second mode, which is mode (2) for WAPs 5 and 6 (e.g., the WAPs 120e, 120f of FIG. 1). The WAPs 5 and 6 appear as having the strongest RSSI for two of the other remaining WAPs. Thus WAPs 5 and 6 are the next to center WAPs.

Next, the process can exclude WAPs 1,4,5,6 and re-take any remaining mode(s). In this example, the two remaining WAPs are WAPs 2 and 3, which are then (by default) the outermost WAPs having a mode of 1.

Lastly, any ambiguity as to specific relative ordering of the WAPs 120 can be determined logically via the second matrix 420. It some examples, it may not be important that the WAP 120c (3) is near the front of the aircraft and the WAP 120b (2) is at the back, but more that the relative order of the WAPs 120 is locally determined by each WAP 120.

The present example shows three pairs of WAPs for six total. However, the disclosed method can be applied to even or odd numbers of WAPs 120. For example, were there only five WAPs 120a-120e, then the first two modes described above for WAPs 120a, 120d, 120e, 120f would remain in the order described. However, one of the WAPs 120b (2), 120c (3) may not be present if there are only five WAPs in the service area 110.

Figure 5:
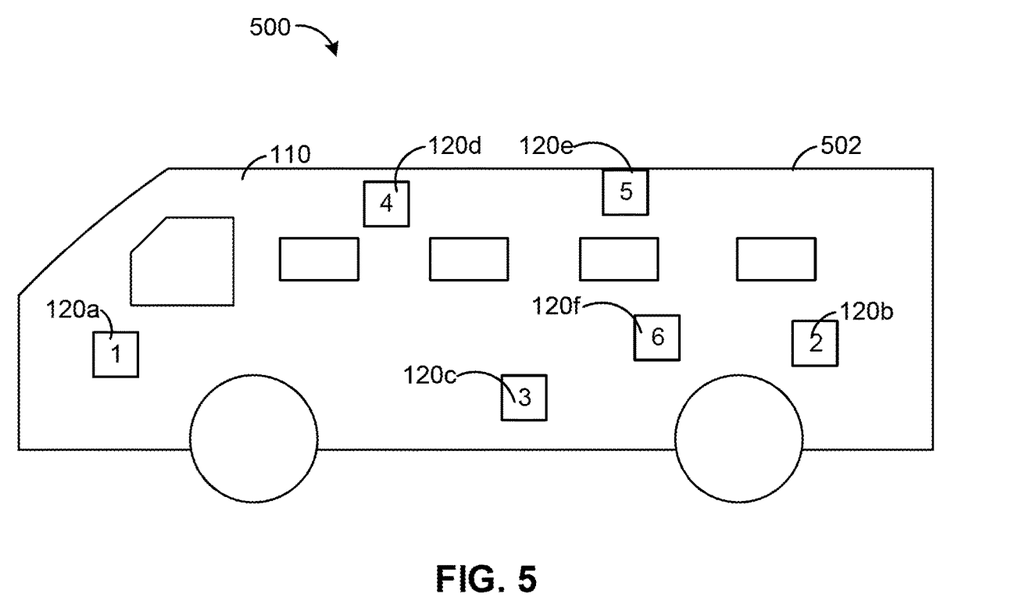
FIG. 5 is a graphical depiction of another embodiment of the service area of FIG. 1.

FIG. 5 is a graphical depiction of another embodiment of the service area of FIG. 1. A system 500 can be similar to the system 100, implementing the service area 110 in bus 502. The bus 502 is not limiting on the disclosure as the service area 110 can be implemented in other passenger vehicles such as a train or boat. The WAPs 120 can be distributed about the bus 502 within the passenger cabin. The WAPs 120a-f can be applied to floors, ceilings, walls, or even under the passenger compartment, depending on the construction of the bus 500 (e.g., or other passenger vehicle). In the two dimensional view of the system 500, only vertical separation is apparent, but as in the system 100 (FIG. 1) lateral separation between the WAPs is also possible. Accordingly, the WAPs 120a-f can have one, two, or three dimensional dispersion or separation throughout the bus 502.

In one example of FIG. 5, the WAPs 120a-f location coordinates X1-X6, Y1-Y6, Z1-Z6 are all different from one another, e.g., so the WAPs 120a-f are 3 dimensionally spaced from one another. In one variation of this example, the WAPs 120a-f location coordinates X1-X6, Y1-Y6, Z1-Z6 may be in the same plane (share one common X, Y. or Z value), e.g., so the WAPS 120a-f are 2 dimensionally spaced from one another. In yet another example of FIG. 5, pairs of the WAPs 120a-f may have the location coordinates X1-X6, Y1-Y6, Z1-Z6, with two or more coordinates and share a common plane (e.g., a 2 dimensional spacing from one another (share one common X, Y, or Z value)). As such, the WAPS 120a-f can be positioned and operate throughout a service area independent of positioning values (e.g., X1-X6, Y1-Y6, Z1-Z6) and can have one dimensional, two dimensional, or three dimensional spacing between each of the WAPs in the disclosed methods and systems.

The methods described above can be applied to the service area 110 within the bus 502 as above. WAPs 120a-120f are shown in the system 500, however, any number of WAPs can be implemented as needed.

Figure 6:
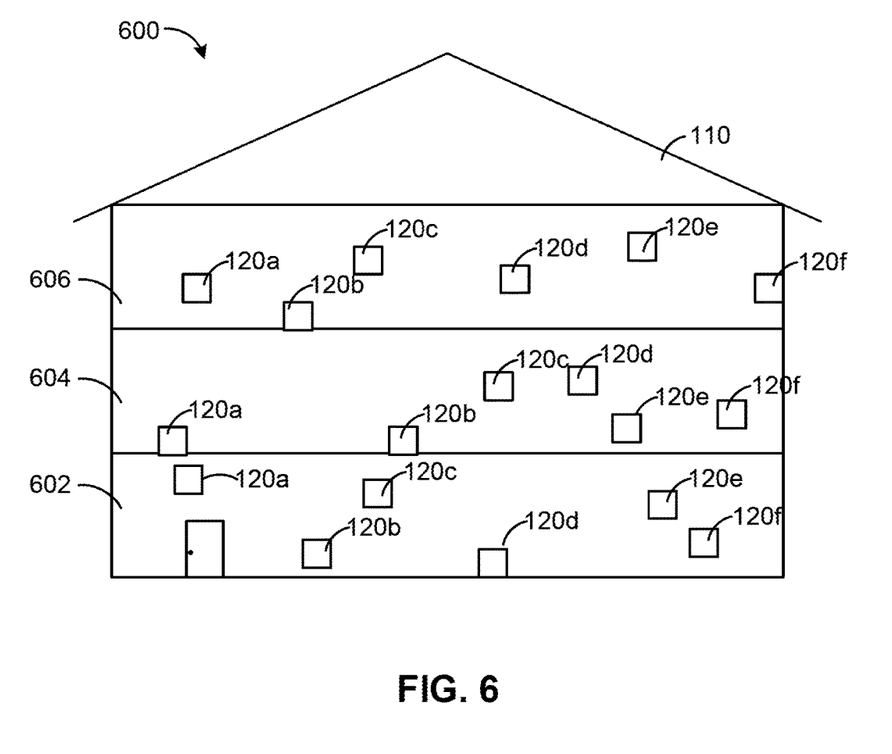
FIG. 6 is a graphical depiction of another embodiment of the service area of FIG. 1.

FIG. 6 is a graphical depiction of another embodiment of the service area of FIG. 1. A system 600 can be similar to the system 100 and the system 500, implementing the service area 110 in a building 600. The building 600 can have multiple floors, such as a first floor 602, a second floor 604, and a third floor 606. A plurality of the WAPs 120 can be distributed about all of the floors 602, 604, 606. The service area 110 within the building 600 can therefore provide coverage to the entire building 600. The method 300 (FIG. 3) can be applied per level of the building; each of the first floor 602, the second floor 604, and the third floor 606 can determine relative spacing to provide optimum service.

In some implementations, each of the first floor 602, the second floor 604, and the third floor 606 can have their own respective service area 110. The WAPs 120 can be disposed throughout the building and each floor on various surfaces such as on the floor, ceiling (e.g., mounted to or within the ceiling), on a desk or book shelf, etc. The WAPs 120 can be distributed to provide optimum coverage throughout the floors 602, 604, 606. As described above, the method 300 provides measurement and comparison of signal strength (e.g., power levels) from each of the WAPs 120 as measured from each other.

In some implementations, the entire building 600, including all of the WAPs 120 on each of the first floor 602, the second floor 604, and the third floor 606, can form a single service area 110. The method 300 can further be applied throughout the building over all floors in systems in which the service area 110 overlaps from floor to floor. Thus, the relative location of the WAPs 120 can be determined via the method 300 (FIG. 3) on each floor and shared among all of the WAPs 120 in the building 600. The signal strengths of all of the WAPs 120 can then be measured and positions determined when comparing power levels to each other. Accordingly, the WAPs 120 can provide service across floors, as needed. For example, a WAP 120 mounted in the ceiling of the first floor 602 may be able to provide wireless service to a user on the second floor 604. Thus, the entire building 600 can implement the method 300 to determine relative spacing among the WAPs 120.

In one example of FIG. 6, the WAPs 120a-f location coordinates X1-X6, Y1-Y6, Z1-Z6 are all different from one another, e.g., so the WAPs 120a-f are 3 dimensionally spaced from one another. In one variation of this example, the WAPs 120a-f location coordinates X1-X6, Y1-Y6, Z1-Z6 may be in the same plane (e.g., share one common X, Y, or Z value), e.g., so the WAPS 120a-f are 2 dimensionally spaced from one another. In yet another example, pairs of the WAPs 120a-f may have the location coordinates X1-X6, Y1-Y6, Z1-Z6, with two or more coordinates and share a common plane (e.g., a 2 dimensional spacing from one another, e.g., share one common X, Y, or Z value). As such, the WAPS 120a-f can be positioned and operate throughout a service area independent of positioning values (e.g., X1-X6, Y1-Y6, Z1-Z6) and can have one dimensional, two dimensional, or three dimensional spacing between each of the WAPs in the disclosed methods and systems.

Other Aspects

The accompanying claims and their equivalents are intended to cover such forms or modifications as would fall within the scope of the disclosure. The various components illustrated in the figures may be implemented as, for example, but not limited to, software and/or firmware on a processor or dedicated hardware. Also, the features and attributes of the specific example embodiments disclosed above may be combined in different ways to form additional embodiments, all of which fall within the scope of the disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, and algorithm operations described in connection with the embodiments disclosed herein may be implemented as electronic hardware, computer software, or combinations of both. To clearly illustrate this interchangeability of hardware and software, various illustrative components, blocks, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, logical blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects.

Thus, the claims are not intended to be limited to the aspects shown herein, but is to be accorded the full scope consistent with the language claims, wherein reference to an element in the singular is not intended to mean "one and only one" unless specifically so stated, but rather "one or more."

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism." "element," "device," and the like may not be a substitute for the word "means." As such, no claim element is to be construed as a means plus function unless the element is expressly recited using the phrase "means for."

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for automated detection of relative position among a plurality of wireless access points (WAPs) deployed in service area, the method comprising:
    transmitting, by the plurality of WAPs, a signal on a wireless channel at a fixed power level across the service area, each signal including a media access control (MAC) address of a respective WAP of the plurality of WAPs;
    measuring, at each WAP of the plurality of WAPs, a signal strength of the signal received from all other WAPs of the plurality of WAPs;
    sharing, among the plurality of WAPs, reports from each WAP including signal strengths of the signal transmitted from all of the other WAPs;
    forming, in a memory, a first matrix of measured signal strengths and measuring WAPs, the measured signal strengths including the signal strength of signals transmitted by each WAP as received by all other WAPs as the measuring WAPs;
    determining a relative position of the plurality of WAPs based on the first matrix;
    forming a second matrix of two WAPs having highest strengths for each measuring WAP within the first matrix; and
    identifying the centermost pair of WAPs in the service area based on a highest mode of the two WAPs having the signal strengths in the second matrix.

2. The method of claim 1 wherein the signal strength comprises one of a received signal strength indicator (RSSI) or a received channel power indicator (RCPI).

3. The method of claim 1, further comprising identifying a second most center pair of WAPs based on a second highest mode of the signal strengths in the second matrix.

4. The method of claim 3, further comprising identifying outermost of WAPs in the service area based on a lowest mode of the signal strengths in the second matrix.

5. The method of claim 1 further comprising repeating the measuring, the sharing, and the determining at a predefined interval.

6. The method of claim 1, wherein the service area is one of a passenger vehicle or a building.

7. A non-transitory computer-readable medium for automated detection of relative position among a plurality of wireless access points (WAPs) deployed in a service area, that when executed by one or more processors cause the one or more processors to:
    transmit a signal on a wireless channel at a fixed power level across the service area, each signal including a media access control (MAC) address of a respective WAP of the plurality of WAPs;
    measure a signal strength of the signal received from all other WAPs of the plurality of WAPs;
    share reports from each WAP including signal strengths of the signal transmitted from all of the other WAPs;
    form a first matrix of measured signal strengths and measuring WAPs in a memory, the measured signal strengths including the signal strength of signals transmitted by each WAP as received by all other WAPs as the measuring WAPs;
    determine a relative position of the plurality of WAPs based on the first matrix;
    form a second matrix of two WAPs having highest strengths for each measuring WAP within the first matrix; and
    identify the centermost pair of WAPs in the service area based on a highest mode of the two WAPs having the signal strengths in the second matrix.

8. The non-transitory computer-readable medium of claim 7 wherein the signal strength comprises one of a received signal strength indicator (RSSI) or a received channel power indicator (RCPI).

9. The non-transitory computer-readable medium of claim 7, further comprising identifying a second most center pair of WAPs based on a second highest mode of the signal strengths in the second matrix.

10. The non-transitory computer-readable medium of claim 9, wherein the instructions further cause the one or more processors to identify outermost of WAPs in the service area based on a lowest mode of the signal strengths in the second matrix.

11. The non-transitory computer-readable medium of claim 7 wherein the instructions further cause the one or more processors to repeating the measuring, the sharing, and the determining at a predefined interval.

12. A system for wireless communication in a service area comprising:
    a first wireless access point (WAP) deployed in the service area and configured to transmit a first signal on a wireless channel at a fixed power level across the service area, the first signal including a first media access control (MAC) address of the first WAP;

a second WAP deployed in the service area and configured to transmit a second signal on the wireless channel at the fixed power level, the second signal including a second MAC address of the second WAP; and a third WAP deployed in the service area and configured to transmit a third signal on the wireless channel at the fixed power level, the third signal including a third MAC address of the third WAP, wherein the first WAP, the second WAP, and the third WAP are further configured to, measure a signal strength of received signals received from all other WAPs; share reports including the measured signal strengths of the received signals with all other WAPs over the wireless channel;

form a first matrix of the measured signal strengths and measuring WAPs in a memory, the measured signal strengths including the signal strength of signals transmitted by each WAP as received by all other WAPs as the measuring WAPs;

determine a relative position of the first WAP, the second WAP, and the third WAP based on the first matrix;

form a second matrix of two WAPs having highest strengths for each measuring WAP within the first matrix; and identify the centermost pair of WAPs in the service area based on a highest mode of the two WAPs having the signal strengths in the second matrix.

13. The system of claim 12 wherein the signal strength comprises one of a received signal strength indicator (RSSI) or a received channel power indicator (RCPI).

14. The system of claim 12, wherein the first WAP, the second WAP, and the third WAP are further configured to identify a second most center pair of WAPs based on a second highest mode of the signal strengths in the second matrix.

15. The system of claim 14, wherein the first WAP, the second WAP, and the third WAP are further configured to, identify outermost of WAPs in the service area based on a lowest mode of the signal strengths in the second matrix.

16. The system of claim 12 wherein the first WAP, the second WAP, and the third WAP are further configured to, repeat the measuring, the sharing, and the determining at a predefined interval.

17. The system of claim 12, wherein the service area is one of a passenger vehicle or a building.

* * * * *